(No Model.)
V. A. TYLER.
THILL COUPLING.
No. 267,469. Patented Nov. 14, 1882.
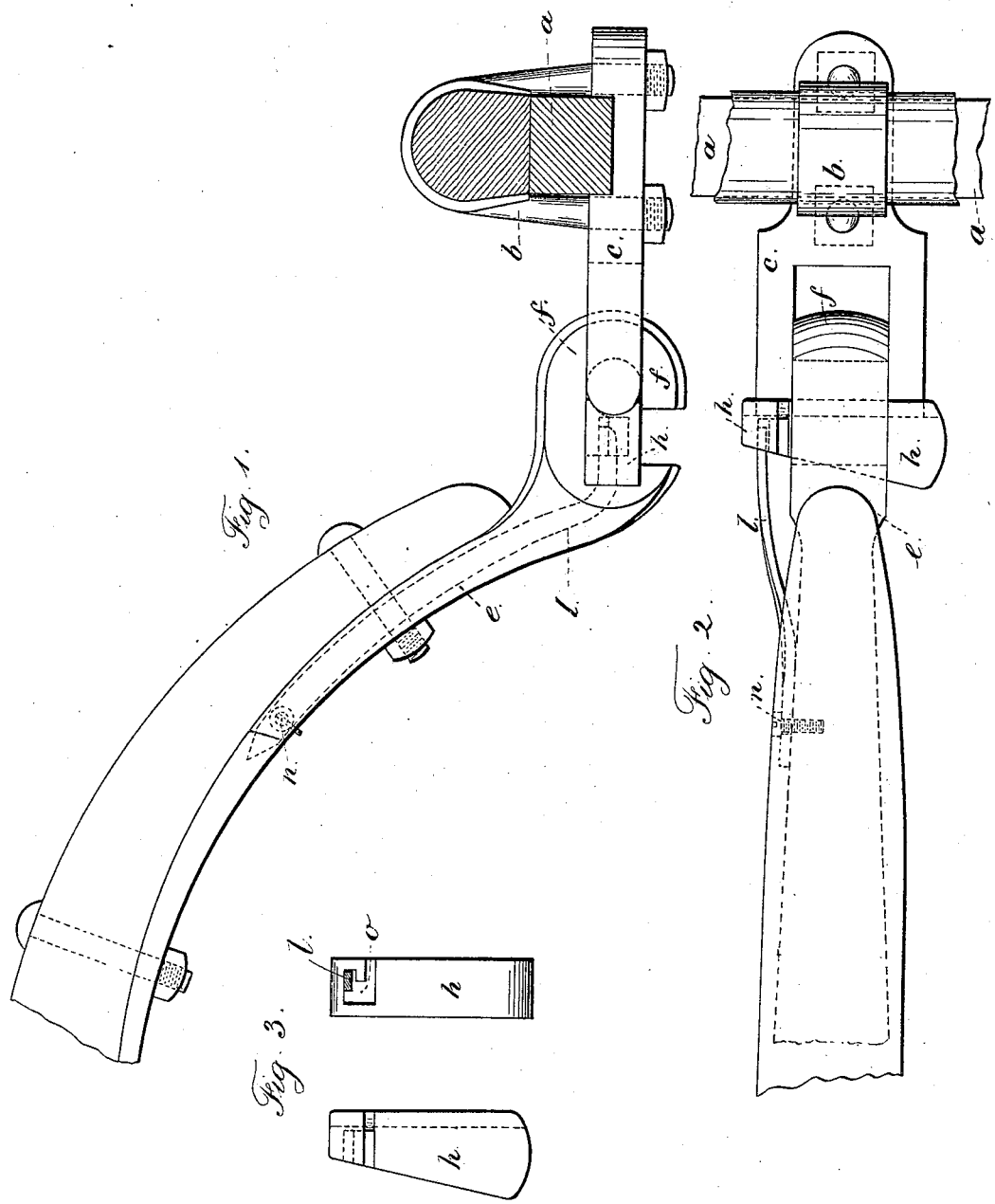

UNITED STATES PATENT OFFICE.

VERNON A. TYLER, OF JAMESTOWN, NEW YORK.

THILL-COUPLING.

SPECIFICATION forming part of Letters Patent No. 267,469, dated November 14, 1882.

Application filed April 12, 1882. (No model.)

*To all whom it may concern:*

Be it known that I, VERNON A. TYLER, of Jamestown, in the county of Chautauqua and State of New York, have invented an Improvement in Thill-Couplings, of which the following is a specification.

Thill-couplings have been made with hooks at the rear ends of the shafts, passed over the loops upon the clip-shackles, and wedges have been placed in such shackles to prevent the couplings unhooking.

My improvement relates to a peculiar hook-coupling, into which is inserted a wedge that closes the mouth of the hook, so that it cannot become disconnected from the shackle-loop; and a spring is applied in such a manner that the wedge is constantly drawn into its place to prevent looseness or rattling of the parts when in use, and to compensate for wear.

In the drawings, Figure 1 is an elevation of the said thill-coupling. Fig. 2 is a plan of the same, and Fig. 3 represents the wedge separately.

The axle $a$, clip or strap $b$, and shackle $c$, are of ordinary character. The draft-pole iron $e$ is connected to the shafts or tongue in any usual manner. The hook $f$, at the rear end of the iron $e$, is made as a link, open at the under side, so that it can be passed over and hooked upon the round part of the shackle $c$, as shown, and the same may easily be removed from said shackle for disconnecting the shafts or pole when the wedge $h$ is removed from the hook $f$. This wedge $h$ is made with one face concave or grooved to fit upon the cylindrical portion of the clip-shackle, and the other edge of the wedge fits the forward part of the interior of such hook, as shown. When this wedge is inserted the parts are firmly connected, so that there will not be any looseness, but the shafts can rise or fall and the hook turn upon the said forward part of the shackle; but to prevent the wedge working loose I make use of the spring $l$, that is attached by the screw $n$, and the point of the spring enters an L-shaped slot in the wedge, as shown at $o$. Said spring, being pressed into the slot and springing up into the angle of the slot, is not liable to become disconnected accidentally, and, being under constant tension, it acts to draw the wedge tightly into place. However, when the end of the spring is sprung out of the slot the wedge can be removed and the coupling disconnected.

I claim as my invention—

1. The combination, with the clip $b$ and shackle $c$, having a rounded front, of the hook $f$ in the form of a link, open at the bottom, and the wedge $h$, inserted into such open hook, and in front of the round part of the shackle $c$, substantially as set forth.

2. The clip $b$ and shackle $c$, in combination with the link-shaped hook $f$, open at the bottom, the wedge $h$, having a concave-grooved side next the shackle, and the spring $l$, acting upon such wedge, substantially as set forth.

Signed by me this 25th day of February, A. D. 1882.

V. A. TYLER.

Witnesses:
A. F. ALLEN BROWN,
H. J. YATES.